(12) United States Patent
Sullivan

(10) Patent No.: US 6,345,711 B1
(45) Date of Patent: Feb. 12, 2002

(54) SEGMENTED FRICTION MEMBER

(75) Inventor: Christopher Sullivan, Warren, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/562,486

(22) Filed: May 1, 2000

(51) Int. Cl.$^7$ ............................................... F16D 13/72
(52) U.S. Cl. ............................ 192/107 R; 192/70.12; 192/70.14; 192/113.36
(58) Field of Search .................... 192/107 R, 70.12, 192/70.14, 113.36; 188/218 XL, 264 E

(56) References Cited

U.S. PATENT DOCUMENTS

| | | | |
|---|---|---|---|
| 4,260,047 A | * 4/1981 | Nels | 192/70.14 |
| 4,674,616 A | * 6/1987 | Mannino, Jr. | 192/107 R |
| 5,332,075 A | 7/1994 | Quigley et al. | |
| 5,566,802 A | 10/1996 | Kirkwood | |
| 5,669,474 A | 9/1997 | Dehrmann et al. | |
| 6,035,991 A | * 3/2000 | Willwerth et al. | 192/107 R |

* cited by examiner

Primary Examiner—Richard M. Lorence
(74) Attorney, Agent, or Firm—Emch, Schaffer, Schaub et al; Greg Dziegielewski

(57) ABSTRACT

A segmented friction member for use in a clutch assembly. The friction member is circular and constructed from a paper-like friction layer. An oil groove extends completely through each friction member segment defining inner and outer segments joined by first and second bridges positioned adjacent the fluid inlet and fluid outlet, respectively.

5 Claims, 3 Drawing Sheets

SEGMENTED FRICTION MEMBER

BACKGROUND OF THE INVENTION

Circular friction members are well known in the art and are often used in clutch assemblies. The term clutch assembly as used in the present specification and claims is used as a generic term and includes apparatus such as torque converters in addition to many other "clutches".

U.S. Pat. No. 5,669,474 discloses the use of a circular friction lining used in a torque converter assembly. This patent also discloses oil grooves defined in the friction lining.

The friction members are often constructed from a paper based friction material having a frictional outer surface.

The generally circular friction member is positioned on one or both sides of a circular support disc, which is normally a metal disc. This overall disk assembly is then positioned within a clutch assembly.

Segmented friction members are also known in the art. A segmented friction member is, for example, shown in U.S. Pat. No. 5,332,075. It is also known in the prior art to provide grooves in the friction lining to serve as paths for a cooling fluid, such as oil. The oil is used to cool the disc assembly. For efficient cooling, the volume of oil must be substantial. At one time in the prior art, the groove depth in the prior art friction members was approximately 25% to 50% of the thickness of the friction member. However, to increase the cooling capacity, it is not unusual to extend the oil groove completely through the friction member. This maximizes the heat transfer from the oil coming in direct contact with the support plate. It has been found that these through grooves in the prior art render the prior art friction member weak and difficult to handle before bonding to a support plate.

With the oil groove extending completely through the prior art friction member, it was often necessary to cut the oil grooves after bonding the prior art friction member to the support plate or in the alternative, to use a separate support member, such as a support ring to hold the pieces of the prior art friction member segments in a proper position before bonding to the support disc or plate. The support rings were removed after bonding.

SUMMARY OF THE INVENTION

The present invention is directed to an improved segmented friction member for use in a disc assembly for a wet-running friction clutch. One preferred use is in a torque converter.

The improved segmented friction member is generally circular. The segmented friction member includes a plurality of arcuate segments having opposed ends. The ends are engaged with mating ends of adjoining segments of each segment. Each of the segments defines an elongated oil groove which separates each of the arcuate segments into an outer section and an inner section. An oil groove inlet is in communication with a first end of the elongated oil groove and an oil outlet is in communication with the second end of the elongated oil groove. First and second bridges connect the inner section with the outer section.

DETAILED DESCRIPTION OF THE PREFERRED EMBODIMENTS

Figure 1:
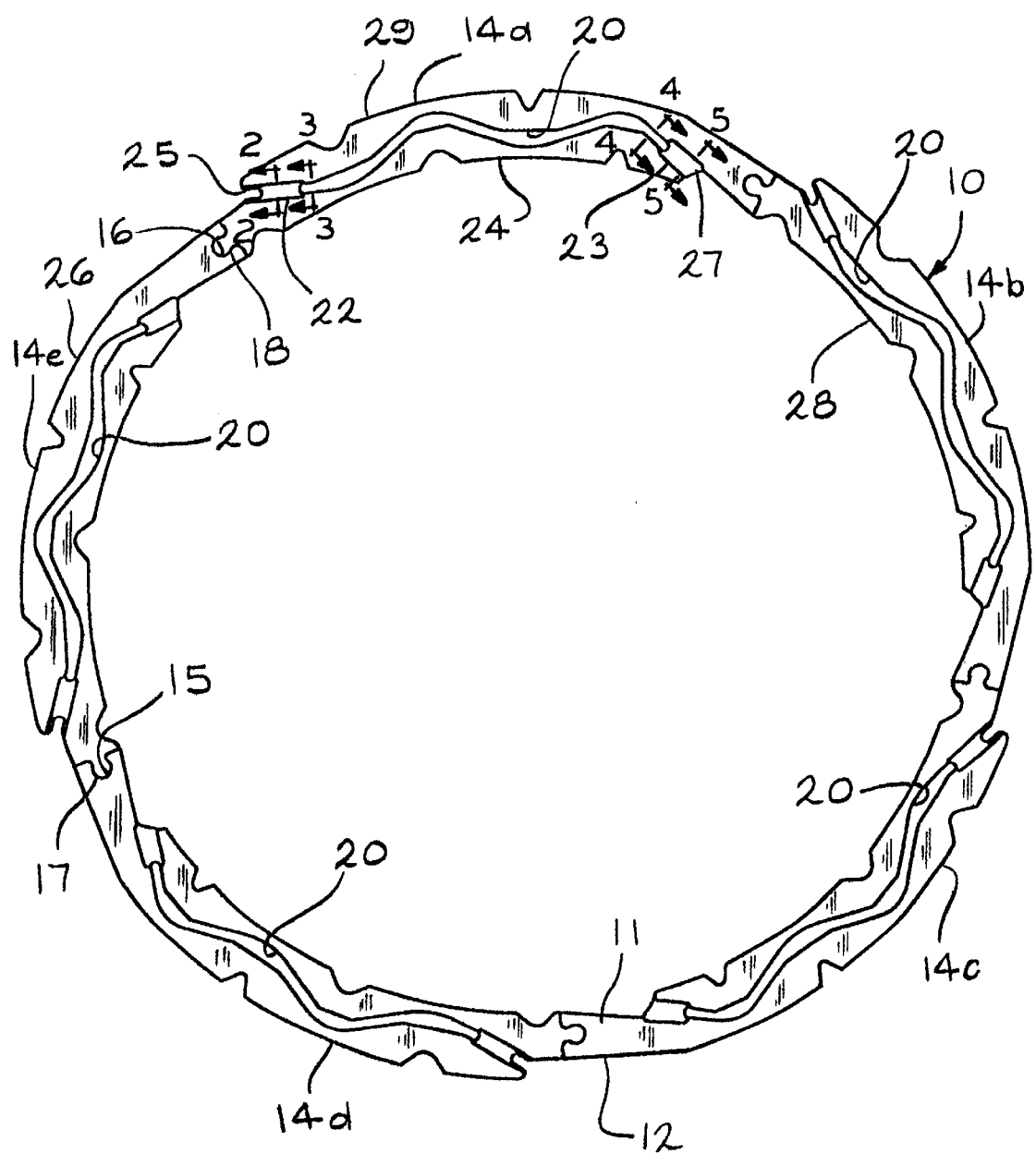
FIG. 1 is a plan view of a segmented friction member, according to the present invention.

Referring to FIG. 1, a segmented friction member, according to the present invention, is indicated in FIG. 1 by the reference number 10. The friction member 10 is circular and is normally constructed of a paper-like material. However, the friction member 10 may be constructed other materials such plastic, metals, nylon and carbon, including non-woven carbon materials. The segmented friction member 10 has a top surface 11 and a bottom surface 12. The segmented friction member 10 includes a plurality of arcuate segments 14a, 14b, 14c, 14d, and 14e. Each of the segments 14a–14e has opposed ends 15 and 16. In the present embodiment, the opposed end 15 defines a tab 17 while the opposed end 16 defines a mating recess 18. The opposed ends 15 and 16 of the segments 14a–14e mate with one another as shown in FIG. 1 to form the overall circular segmented friction member 10.

Each of the segments 14a–14e defines an elongated oil groove 20. In the present embodiment, illustrated in FIG. 1, the oil groove 20 has a serpentine path extending along the arcuate length of the segment 14 and extends completely through the segments 14 with the exception of a pair of bridges 22 and 23. Normally, two bridges are utilized. However, more bridges can be used and fall within the scope of the present invention. Each of the segments 14a–14e defines an oil inlet 25 adjacent the outer periphery 26 of the friction member 10 and an oil outlet 27 adjacent the inner periphery 28 of the friction member 10. Preferably the bridge 22 is positioned adjacent the oil inlet 25 and the bridge 23 is positioned adjacent the oil outlet 27. Additional oil inlets and outlets may be provided, which communicate with the groove 20. The remainder of the oil groove 20 extends completely through the segmented friction member 10 from the top surface 11 to the bottom surface 12. The present construction allows the segmented friction member 10 to be die cut during manufacture as opposed to, for example, having the oil groove milled after the friction member 10 is adhered or positioned on the support plate of the overall disc assembly.

By having the oil groove 20 extend completely through the segmented friction member 10, maximum desired fluid cooling is achieved.

The bridges 22 and 23 are normally formed with a forming die which compresses the bridges 22 and 23 to their desired thicknesses. In a preferred embodiment, the bridges 22 and 23 are integral with inner section 24 and outer section 29. The bridges 22 and 23 hold the inner section 24 and outer section 29 together as a unit even though the remaining portion of the oil groove 20 extends from the top surface 11 to the bottom surface 12. In the embodiment shown in FIG. 1, the inlet bridge 22 is compressed less than 50% of the depth defined by the top surface 11 and bottom surface 12 of the friction member 10. The height or thickness of the bridges 22 and 23 is between 50% and 75% of the thickness of the lining or friction member 10. Preferably, the inlet 22 has a thickness of 70% of the thickness of the friction member 10. The outlet bridge 23 has a preferable thickness of approximately 50% of the thickness of the friction member 10. This restricts oil flow across the bridge 22, thereby adjusting the pressure of the oil within the groove 20.

Figure 2:
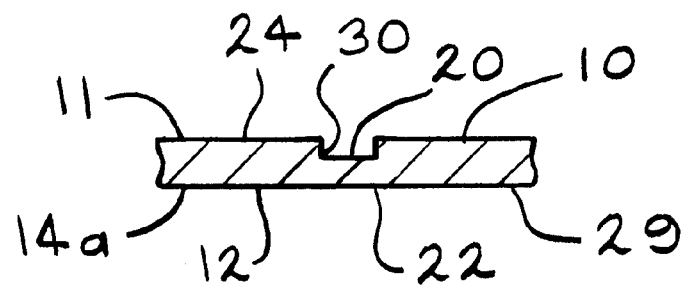
FIG. 2 is a cross-sectional view, on an enlarged scale, taken along the line that 2—2 of FIG. 1.
Figure 3:
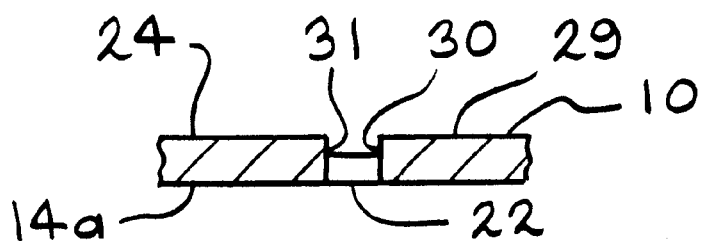
FIG. 3 is a cross-sectional view, on an enlarged scale, taken along the line 3—3 of FIG. 1.

FIG. 2 illustrates a cross-section of the oil groove 20 at the location of the bridge 22. A reduced area flow channel 30 is illustrated while FIG. 3 shows a cross-section of the oil groove 20 immediately on the downstream side of the bridge 22. A completely open flow channel section 31 is shown.

Figure 4:
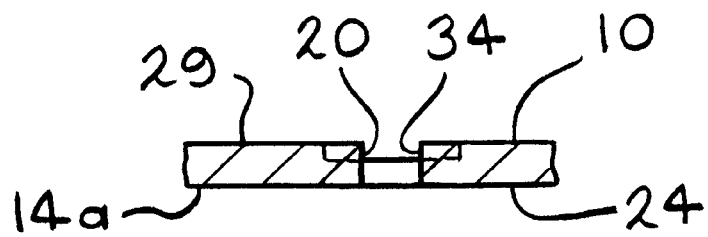
FIG. 4 is a cross-sectional view, on an enlarged scale, taken along the line 4—4 of FIG. 1.
Figure 5:
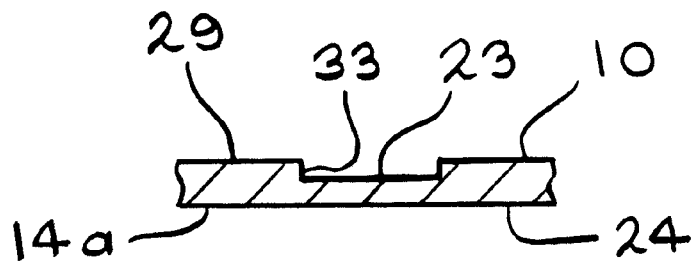
FIG. 5 is a cross-sectional view, on an enlarged scale, taken along the line 5—5 of FIG. 1.

At the other end of the segments 14, the outlet bridge 23 (see FIG. 5) has a reduced thickness and defines a more open flow channel 33. The oil groove 20 has a narrower width flow channel 34 than the flow channel 33 at the bridge location in FIG. 5. The flow channel 33 has been widen to provide the same flow area as is found in the flow channel 34, illustrated in FIG. 4. Therefore, because the areas of the flow channels 33 and 34 are the same, there is no flow restriction or change of pressure at the location of the bridge 23.

Normally, the thickness of the bridges 22 and 23 are 75% to 50% of the overall thickness of the segments 14a–14e, as defined by the top surface 11 and bottom surface 12. As indicated above, the first bridge 22 is compressed during bonding to restrict or control the flow rate while the second bridge 23 is compressed forming a wider channel 33 to maintain the oil groove cross-sectional area so as not to restrict oil flow. The bridges may be designed to control the restriction of the inlet or outlet or to render the bridges non-restrictive.

The segmented friction member 10, according to the present invention, utilizes significantly less friction material than that of a full friction material ring and is more economical as compared to cutting the oil grooves after bonding or using a support ring to hold the separated segments together during bonding and then removing the supporting ring.

Figure 6:
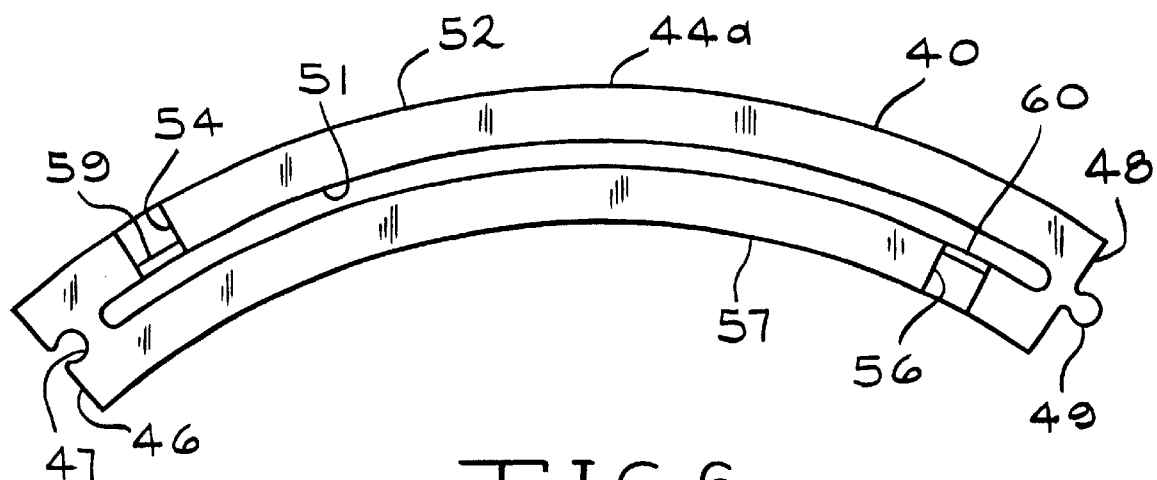
FIG. 6 is a plan view of a segment of another embodiment of a friction member, according to the present invention.
Figure 7:
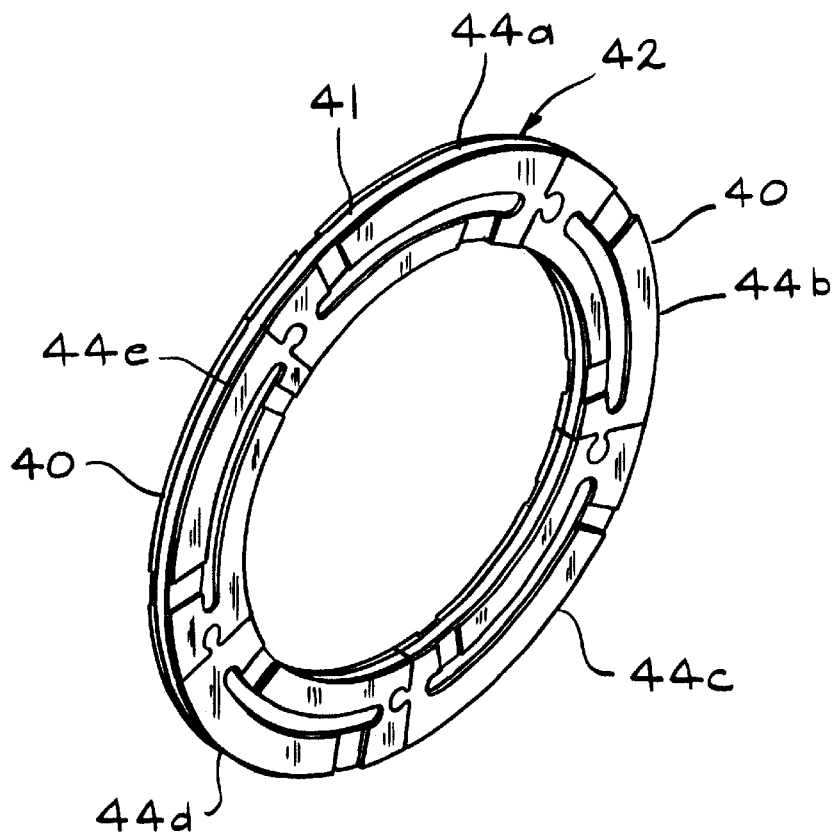
FIG. 7 is a perspective view of a disc assembly including the FIG. 6 embodiment of a segmented friction member, according to the present invention.

Another embodiment of a segmented frictional member, according to the present invention is shown in FIGS. 6 and 7 and is generally indicated by the reference number 40. The segmented friction member 40 is again constructed preferably of a friction paper layer and is mounted on a cover, piston or plate 41. When used in a torque converter, the plate 41 would normally include drive teeth (not shown) on the outer circumference or on the inner periphery. In the present embodiment, referring to FIG. 7, a second segmented friction member 40 is mounted on the opposite side of the plate or disc 41 to form an overall disc assembly 42. The segmented friction member 40 includes a plurality of interlocked segments 44a–44e.

As best shown in FIG. 6, each of the segments 44a–44e includes a first end 46 which defines a recess 47 and a second end 48 which defines a tab 49. The tabs and recesses 47 and 49 of the segments 44a–44e, are interlocked with the adjacent segments to form the complete circular segmented friction member 40, as shown in FIG. 7. A groove 51 extends completely through the individual segments 44a–44e and follows a path which is generally concentric with the outer periphery 52 of the friction member 40. An inlet 54 extends from the outer periphery 52 and an outlet 56 extends from the opposite end of the groove 51 to an inner circumference 57 of the segmented friction member 40. A first bridge 59 is provided at the fluid inlet 54 adjacent the groove 51 and a second bridge 60 is provided in the fluid outlet 56 adjacent the groove 60.

In the present embodiment, the thickness of the bridge 59 is more than 50% of the thickness of the segmented friction member 40 while the second bridge 60 is approximately 50% of the thickness of the segmented friction member 40. Normally, the bridges are compressed to a thickness of between 50% and 75% of the thickness of the friction. Therefore, as fluid, such as oil enters the inlet 54, the area of the inlet is reduced at the first bridge 59 thereby increasing the pressure a desired amount while the cross-sectional area of the second bridge 60 closely approximates the adjacent area of the oil groove 60. This allows a flow of cooling fluid, such as oil across the second bridge 60 without a pressure build up.

Many revisions may be made to the above-described embodiments without departing from the scope of the present invention or from the following claims.

I claim:

1. A segmented friction member for use in a clutch assembly, said friction member being generally circular and having a top surface and a bottom surface, said friction member having a circular outer periphery and a circular inner periphery, said segmented friction member including a plurality of arcuate segments having opposed ends, said ends being engaged with mating ends of adjoining arcuate segments, each of said segments defining an elongated oil groove, said elongated oil groove extending in a generally arcuate path, said oil groove separating said arcuate segment into an outer elongated section adjacent said outer periphery of said friction member and an inner elongated section adjacent said inner periphery of said friction member, an oil groove inlet in communication with a first end of said elongated oil groove and an oil outlet in communication with a second end of said elongated oil groove, and first and second bridges extending between said outer section and said inner section, said first bridge being positioned adjacent said outer periphery of said friction member and said second bridge being positioned adjacent said inner periphery of said friction member, whereby said first and second bridges connect said inner and outer sections of said arcuate segment, said elongated oil groove extending completely through said segmented friction member except at the location of said first and second bridges.

2. A segmented friction member, according to claim 1, wherein said segmented friction member comprises a paper based friction layer and each of said bridges comprises a compressed portion of said paper based friction layer.

3. A segmented friction member, according to claim 1, wherein said first bridge is adjacent said oil inlet, said oil groove having a flow channel area adjacent said first bridge, said oil groove at said first bridge having a reduced flow channel area at said first bridge.

4. A segmented friction member, according to claim 1, wherein said second bridge is adjacent said oil outlet, said oil groove having a flow channel area adjacent said second bridge, said oil groove at said second bridge being wider and having the same flow channel area as such flow channel area of such adjacent oil groove.

5. A segmented friction member, according to claim 1, wherein said first and said second bridges have a thickness of between 50% and 75% of the thickness of said friction member.

* * * * *